US009824347B2

(12) United States Patent
Griggs et al.

(10) Patent No.: US 9,824,347 B2
(45) Date of Patent: Nov. 21, 2017

(54) SERIALIZATION AND DATABASE METHODS FOR TUBULARS AND OILFIELD EQUIPMENT

(71) Applicant: Weatherford Technology Holdings, LLC, Houston, TX (US)

(72) Inventors: Paul Steven Griggs, Conroe, TX (US); Patrick M. Ljungdahl, Kingwood, TX (US); Stephen Sarradet, Houston, TX (US); Larry Williams, Houston, TX (US); Matthew G. Miller, Late of Richmond, TX (US); Tuong Thanh Le, Katy, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 160 days.

(21) Appl. No.: 13/914,275

(22) Filed: Jun. 10, 2013

(65) Prior Publication Data
US 2014/0006227 A1 Jan. 2, 2014

Related U.S. Application Data

(62) Division of application No. 11/564,056, filed on Nov. 28, 2006, now Pat. No. 8,463,664.
(Continued)

(51) Int. Cl.
G06Q 20/20 (2012.01)
E21B 17/00 (2006.01)
G06Q 10/08 (2012.01)

(52) U.S. Cl.
CPC ......... *G06Q 20/203* (2013.01); *E21B 17/006* (2013.01); *G06Q 10/087* (2013.01)

(58) Field of Classification Search
None
See application file for complete search history.

(56) References Cited

U.S. PATENT DOCUMENTS 4,698,631 A * 10/1987 Kelly et al. ............... 340/853.1
5,142,128 A     8/1992 Perkin et al.
(Continued)

FOREIGN PATENT DOCUMENTS

GB    2247904 A    3/1992
WO    02/06632     1/2002
(Continued)

OTHER PUBLICATIONS

Canadian Office Action for Canadian Patent Applicaton No. 2,568,950, dated Jul. 22, 2014.
(Continued)

*Primary Examiner* — Paul Danneman
(74) *Attorney, Agent, or Firm* — Patterson & Sheridan, LLP

(57) ABSTRACT

Methods and apparatus identify downhole equipment and correlate input data with the equipment to improve planning and/or inventory operations. For some embodiments, oilfield equipment or tubular goods such as drill pipe include a shaped recess along an outer circumference for receiving a tag cartridge by shrink fitting. Once tagged, detector system configurations at pipe yards may facilitate logging the presence and location of each drill pipe and correlating specific data, such as inspection data, to each drill pipe. Further, this correlation populates a database utilized to achieve other business functions such as forecasting number of additional drill pipe needed to purchase, invoicing customers according to actual tracked wear/use of the drill pipe being returned, and providing well or job specific drill string population using known history pipe joints.

8 Claims, 4 Drawing Sheets

Related U.S. Application Data

(60) Provisional application No. 60/740,406, filed on Nov. 28, 2005.

(56) References Cited

U.S. PATENT DOCUMENTS

| | | | |
|---|---|---|---|
| 5,202,680 A * | 4/1993 | Savage | 340/853.1 |
| 5,289,372 A | 2/1994 | Guthrie et al. | |
| 5,360,967 A | 11/1994 | Perkin et al. | |
| 5,656,786 A * | 8/1997 | Curtis, Jr. | G06Q 10/06 73/865.8 |
| 6,333,700 B1 | 12/2001 | Thomeer et al. | |
| 6,347,292 B1 | 2/2002 | Denny et al. | |
| 6,480,811 B2 | 11/2002 | Denny et al. | |
| 6,973,416 B2 | 12/2005 | Denny et al. | |
| 7,014,100 B2 | 3/2006 | Zierolf | |
| 7,030,761 B2 * | 4/2006 | Bridgelall et al. | 340/572.2 |
| 7,084,769 B2 | 8/2006 | Bauer et al. | |
| 7,159,654 B2 | 1/2007 | Ellison et al. | |
| 7,669,763 B2 | 3/2010 | Ernesti et al. | |
| 7,707,076 B1 | 4/2010 | Whiteley et al. | |
| 2002/0014966 A1 * | 2/2002 | Strassner | E21B 17/006 340/572.1 |
| 2002/0030854 A1 | 3/2002 | Schutz et al. | |
| 2002/0035448 A1 | 3/2002 | Denny et al. | |
| 2003/0156033 A1 | 8/2003 | Savage et al. | |
| 2003/0174099 A1 | 9/2003 | Bauer et al. | |
| 2003/0201321 A1 | 10/2003 | Maloney | |
| 2004/0078151 A1 | 4/2004 | Aljadeff et al. | |
| 2004/0102870 A1 | 5/2004 | Andersen et al. | |
| 2005/0154988 A1 | 7/2005 | Proehl et al. | |
| 2005/0230109 A1 | 10/2005 | Kammann et al. | |
| 2005/0230110 A1 | 10/2005 | Ellison et al. | |
| 2005/0270156 A1 | 12/2005 | Ravet | |
| 2006/0187043 A1 | 8/2006 | Allen | |
| 2008/0266092 A1 * | 10/2008 | Campero et al. | 340/572.1 |

FOREIGN PATENT DOCUMENTS

| | | |
|---|---|---|
| WO | 2005/100733 A1 | 10/2005 |
| WO | 2005/111959 A2 | 11/2005 |

OTHER PUBLICATIONS

Canadian Office Action for Application No. 2,568,950 dated Sep. 25, 2013.

\* cited by examiner

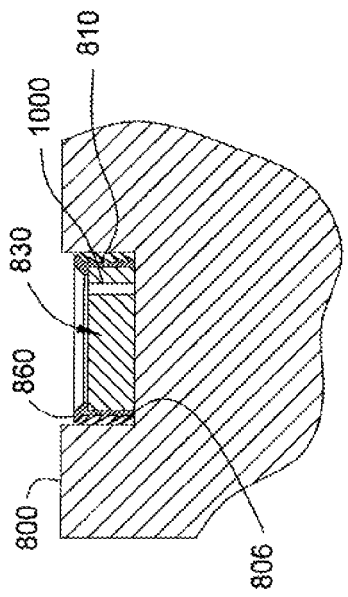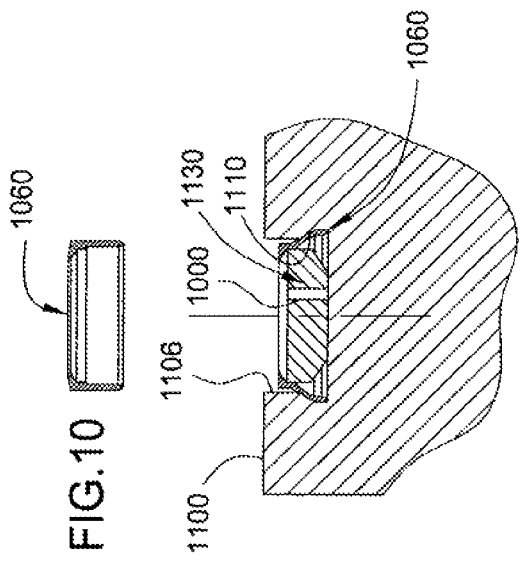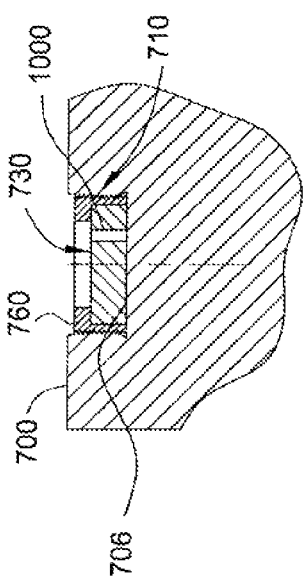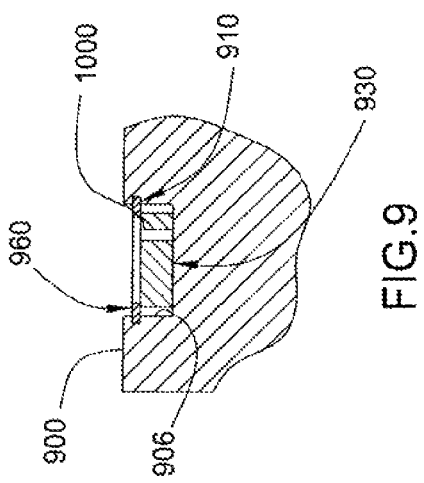

SERIALIZATION AND DATABASE METHODS FOR TUBULARS AND OILFIELD EQUIPMENT

CROSS-REFERENCE TO RELATED APPLICATIONS

This application is a divisional of U.S. patent application Ser. No. 11/564,056, filed Nov. 28, 2006, which claims benefit of U.S. provisional patent application Ser. No. 60/740,406, filed Nov. 28, 2005, which are herein incorporated by reference.

BACKGROUND OF THE INVENTION

Field of the Invention

Embodiments of the invention generally relate to identification of downhole oil/gas well drilling and completion equipment and correlation of input data with the equipment to improve inventory and planning operations.

Description of the Related Art

Exploration, production and completion of hydrocarbon wells require numerous pieces of oilfield or downhole equipment, such as mud motors, drill bits, underreamers, jars, drill collars, measurement-while-drilling (MWD) or logging-while-drilling (LWD) tools, cementing plugs or floats, and other tubular goods including drill pipe, casing and expandable casing, liners and expandable liners, and sand screens. Much of this equipment lasts for many years of usage such that the equipment may be reused for different jobs. To therefore mitigate costs associated with the use of the equipment, rental companies supply customers with their needs for such equipment by maintaining the equipment at inventory locations such as pipe yards.

One issue that rental companies encounter involves assessing whether the equipment may be safely and reliably reused or is at the end of its lifespan. Use and rotation of the drill pipe, for example, in the hole leads to material fatigue and erosive and corrosion wearing of the inner and outer diameters of the drill pipe. Accordingly, inspections of the drill pipe detect wall wear and any other defects to aid in ensuring that the drill pipe does not fail downhole. The drill pipe passing inspection returns to the pipe yard for subsequent rental without further analysis of inspection results by the rental company while the drill pipe failing the inspection is discarded, otherwise retired or de-rated.

Individual asset identification represents another issue that rental companies confront. Some inventory management techniques may employ unique serialization of each drill pipe. However, prohibitive costs and lack of acceptable serial numbering options limits application of any asset tracking achievable by the rental company utilizing such serialization and results in deficiencies with respect to performing desirable business functions of these companies.

Various approaches enable differentiating and identifying each drill pipe. For example, the drill pipe may include attachments incorporating steel stenciled serial numbers, which tend to wear or erode away over time, require manual inspection & replacement, and may need cleaning to be visible. When the stenciled number is located in a hole drilled or milled slot in an outer diameter of the drill pipe tool joint, the stenciled numbers may correspond to numbers on a plug inserted into the drilled hole in order to identify the drill pipe if the numbers wear off the plug or the plug falls out, but small character size required for enough digits in the drilled hole affects legibility. Attempts to identify drill pipe with radio frequency identification tags affixed to the drill pipe require expensive, complex and/or obtrusive attachment configurations that may harm performance of the drill pipe and often cannot withstand operations downhole.

Therefore, there exists a need for methods and apparatus for identification of downhole equipment and correlation of input data with the equipment to improve planning and inventory operations.

SUMMARY OF THE INVENTION

For some embodiments, a system for managing oil field tubular goods includes a tubular member having a remotely machine readable identification tag, and a detector positioned within an inventory location to read the identification tag, wherein the detector is positioned and configured to automatically track movement of the tubular member into and out of the inventory location.

According to some embodiments, a method of managing oil field tubular goods includes providing a tubular member having a unique identification tag, and tracking movement of the tubular member into and out of an inventory location by reading the identification tag with a detector.

In some embodiments, a method of managing oil field tubular goods, includes providing a tubular member having a remotely readable identification tag, gathering data associated with the tubular member, correlating the data and an identification code of the identification tag in a signal bearing medium, and invoicing for actual wear to the tubular member as determined based on the correlating.

For some embodiments, a method of managing items of oilfield equipment includes providing each item of oilfield equipment with a remotely readable identification tag, gathering data associated with the items of oilfield equipment, correlating the data with an identification code of the identification tag of each item of oilfield equipment in a signal bearing medium, storing the data cross-referenced to the identification code in a computer system, interrogating the computer system to locate items of oilfield equipment according to one or more criterion based upon the stored data, and identifying the location of each item of oilfield equipment, which satisfies the given one or more criterion.

BRIEF DESCRIPTION OF THE DRAWINGS

So that the manner in which the above recited features of the present invention may be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 is a cross section of a drill pipe portion having an identification cavity with a complimentary tag cartridge threaded into the cavity, according to embodiments of the invention.

FIG. 8 is a cross section of a drill pipe portion having an identification cavity with a complimentary tag cartridge slip fit into the cavity, according to embodiments of the invention.

FIG. 9 is a cross section of a drill pipe portion having an identification cavity with a tag cartridge retained in the cavity by a snap ring, according to embodiments of the invention.

FIG. 10 is a cross section of a carrier of a deformable tag cartridge prior to final assembly, according to embodiments of the invention.

FIG. 11 is a cross section of a drill pipe portion after the carrier shown in FIG. 10 is deformed in an identification cavity during assembly, according to embodiments of the invention.

DETAILED DESCRIPTION

Embodiments of the invention relate to identification of downhole equipment and correlation of input data with the equipment to improve operations. For some embodiments, oilfield equipment or tubular goods such as drill pipe include an improved tag. Once tagged, detector system configurations at pipe yards may facilitate logging the presence and location of each drill pipe and correlating specific data, such as inspection and usage data, to each drill pipe. Further, this correlation populates a database utilized to achieve other business functions such as forecasting and refining future purchasing of additional drill pipe, handling customers' accounts, returning drill pipe based on actual tracked wear/use of the drill pipe being returned, and providing well or job specific drill string population using known history pipe joints.

Figure 1:
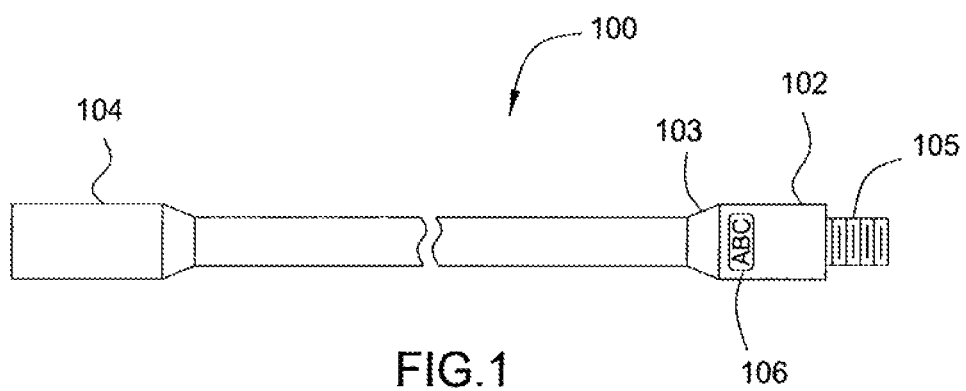
FIG. 1 is a side view of a drill pipe having an identification groove disposed on an exterior surface of the drill pipe to define a receptacle for receiving a complimentary tag cartridge, according to embodiments of the invention.
Figure 2:
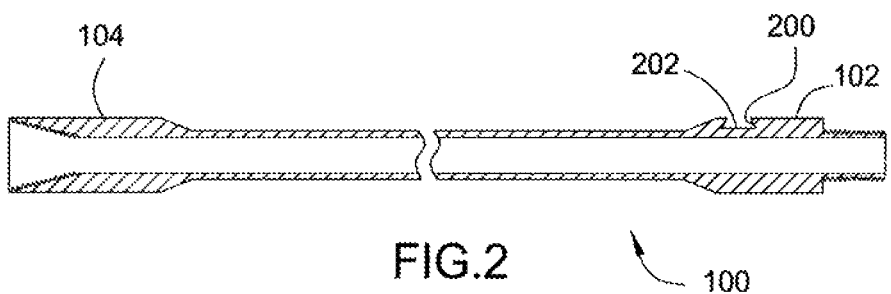
FIG. 2 is a cross section of the drill pipe having the identification groove with sides that converge toward an opening of the groove, according to embodiments of the invention.

FIGS. 1 and 2 illustrate a drill pipe 100 having a pin end 102 and a box end 104. The pin end 102 includes an identification groove 106 with sides 200 that converge toward an opening of the groove 106. For some embodiments, the groove 106 defines a dove tailed or bell shaped cut or slot along an exterior radially outermost wall surface of the drill pipe 100 between an upset or outward shoulder 103 and a threaded section 105 of the pin end 102. This location disposes the groove 106 in an area of the drill pipe 100 having a relatively thick wall compared to other sections of the drill pipe 100. In addition, the groove 106 opens perpendicular to a longitudinal center axis of the drill pipe 100.

Figure 3:
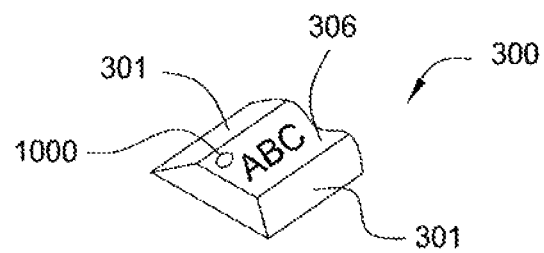
FIG. 3 is a perspective view of the complimentary tag cartridge prior to insertion into the identification groove of the drill pipe, according to embodiments of the invention.

FIG. 3 shows a complimentary tag cartridge 300 prior to insertion into the identification groove 106 of the drill pipe 100. The groove 106 defines a receptacle for receiving the complimentary tag cartridge 300 such that the sides 200 of the groove 106 mate with edge surfaces 301 of the cartridge 300. Tight interference contact fitting of the cartridge 300 within the groove 106 may retain the cartridge 300 in place due to thermal expansion properties of the drill pipe 100 and cartridge 300. As the cartridge 300 is inserted, cooling the cartridge 300 while at least pin end 102 of the drill pipe 100 is heated may aid in retaining the cartridge 300 in place. Simple and reversible retention of the cartridge 300 within the groove 106 enables easy replacement of the cartridge 300 as needed.

For some embodiments, the tag cartridge 300 includes or encapsulates in a protective manner a remotely machine readable identification member such as a radio frequency identification (RFID) tag, optical bar code, and/or surface acoustic wave (SAW) tag that is unaffected by radiation such as from well logging tools. A top surface 306 of the tag 300, a bottom surface of the tag 300, or both may include visible identification markings or alphanumeric coding (depicted as "ABC" and hereinafter referred to as numbers), unique to the drill pipe 100 as a secondary or primary identification mechanism. Unique coding may differentiate the type of asset (e.g., drill pipe, casing, etc.), the manufacturer, and/or the owner.

Penetration to profile the top surface 306 of the tag 300 may form a barcode that may still be read should some damage occur to the top surface 306. In some embodiments, a two dimensional (2D) bar code or matrix code may encode redundant information at various different locations within the bar code such that the information may also still be read in the event some damage occurs to portions of where the bar code is located. For example, the 2D bar code may be burned by laser with penetration of about 0.076 millimeters into the top surface 306 of the tag cartridge 300, which may be formed of stainless steel, and/or applied directly to the drill pipe 100. The 2D bar code contains a grid of square cells instead of bars or stacked bars representing linear codes. Further, the numbers on the tag 300 may match or be correlated to numbers stenciled onto a bottom surface 202 of the groove 106 in the drill pipe 100, which is protected by the cartridge 300. This redundancy in identifying the drill pipe 100 enables at least manual identification of the drill pipe 100 in the event that the cartridge 300 fails or is lost.

Dimensions of the groove 106 ensure sufficient material for secure shrink fitting or bonding of the cartridge 300 within the groove 106 and aid in providing space for multiple legible numbers to be visible on the top surface 306 of the cartridge 300 and/or the bottom surface 202 of the groove 106. For some embodiments, the groove 106 measures about 4.0 inches in length and about 0.75 inches in width. Minimum outer diameter standards for the drill pipe 100 may determine a maximum depth of the groove 106.

The foregoing describes improved tagging designs. Therefore, the tag cartridge 300 and groove 106 in the drill pipe 100 provide exemplary techniques to identify each individual item whether drill pipe, as used as an example herein, or other oil field equipment in a unique manner, whether or not the equipment is expendable or reusable. However, some embodiments of the invention may incorporate different identification tagging designs in their implementation.

Figure 4:
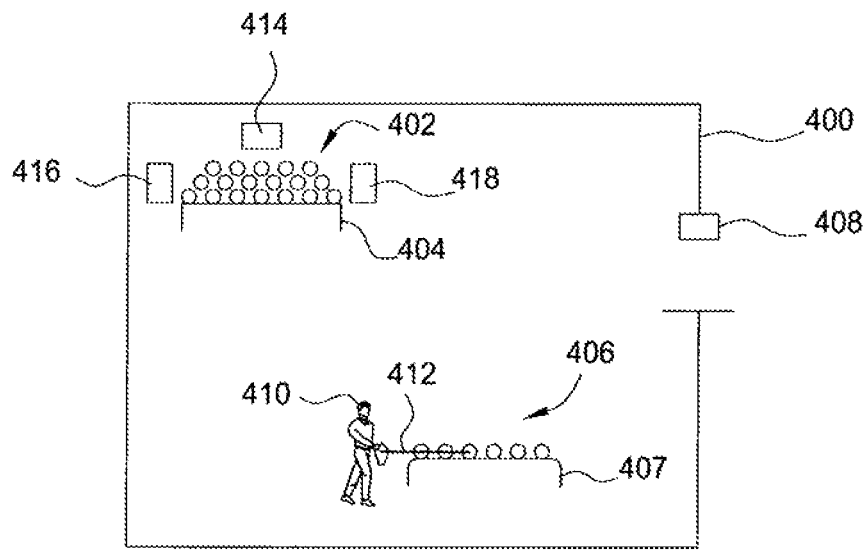
FIG. 4 is a schematic of a pipe yard implemented with an identification member reading system, according to embodiments of the invention, for use with remotely machine readable identification members such as the tag cartridge on the drill pipe.

FIG. 4 illustrates an identification member reading system implemented in a pipe yard 400. The pipe yard 400 therefore may include one or more of a gate detector 408, a hand-held detector 412, and first, second and third triangulation detectors 414, 416, 418 for use with remotely machine readable identification members such as the tag cartridge 300 on the drill pipe 100. Each drill pipe segment or joint within a pipe stack 402 (shown end on) on a storage rack 404 and each drill pipe within a pipe lineup 406 on an inspection rack 407 includes at least one remotely machine readable identification member expressing a serial number preferably unique to each individual pipe.

Figure 5:
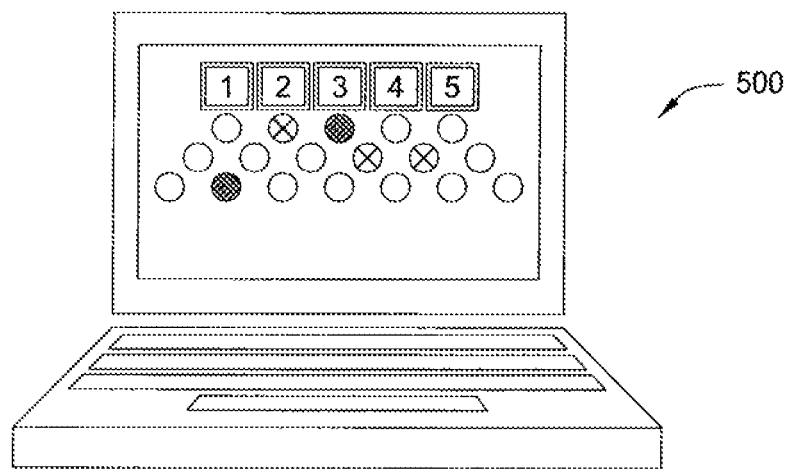
FIG. 5 is an exemplary output displayed on a computer to graphically show location of the drill pipes meeting set criteria, according to embodiments of the invention.

The detectors 408, 412, 414, 416, 418 may represent any RFID reader (antenna and decoder), magnetic flux leakage detector, or other suitable device such as a Personal Digital Assistant (PDA) with a scanner or camera, which reads the identification members and records to a database maintained in a computer (see, FIG. 5 for example). The detectors 408, 412, 414, 416, 418 and/or any other hand-held, movable, or fixed detector communicate to the database that may be internal or external to the reader. In operation, the detectors 408, 412, 414, 416, 418 may communicate to/from the database either by wire(s), fiber optics or wireless electromagnetic such as radio frequency, optical, or microwave communication. The serial number and/or inspection information may be communicated directly and immediately to the database or may be held temporarily by electronic memory inside the detectors 408, 412, 414, 416, 418 for later transfer to the database.

Information input, contained and/or manipulated in the database may include asset tracking inputs such joint serial number, customer name, number of days out, and delivery ticket number. Inspection inputs may include report number, joint serial number, inspection standard used (e.g., ISO, RP7G, TH HILL, or NS1 and/or NS2), and test method used (e.g., dye penetrant, liquid penetrant, transverse, longitudinal, or shear wave). The database may further contain maximum and minimum dimensions by specification. In addition, the physical properties of the inventory input into the database may include size, weight, grade, and overall length. Tool joint related information may be captured in the database, such as thread, condition (e.g., pass/fail or reface/machine), double shoulder threaded connections (e.g., pin length and box length), counter bore, bore back, stress relief groove, bevel diameter, benchmark (e.g., yes/no), outer diameter of the box, outer diameter of the pin, inner diameter of the pin, hard banding (e.g., yes/no, pin, box, center dimension). Input relating to a tube may include API values and may relate to class (e.g., new, premium plus, premium, or class 2), minimum wall thickness, and straightness. With respect to tube and tool joint, information input may include plastic coating (e.g., yes/no and condition), inner diameter condition, and drifting (e.g., full length drift pass/fail and dimensions). Other inventory input data may include drill collar information (e.g., elevator recess outer diameter and slip recess outer diameter) and other relevant data (e.g., heavy-center wear pad outer diameter, spiral-spiral outer diameter center, heavy and spiral-integral or welded).

Each drill pipe within the pipe lineup 406 undergoes inspection for wear and fatigue damage. During this inspection the identification members may be read automatically (e.g., there may be a plurality of stationary readers mounted in proximity to the inspection rack) or at least by machine with the hand-held detector 412 operated by a user 410. The individual serial numbers and inspection results communicate to the database and correlate in the database where this input information is stored for future manipulation and analysis described hereinafter. For some embodiments, the hand-held detector 412 may be integrated with a caliper or other inspection tool to enable automated writing to the database regarding inspection information, such as wall thickness in the case of the caliper. The inspection results may include wall thickness, outside diameter, inside diameter, crack detection, pitting, maintenance history, length, connection size and type, material type and strength, API or ISO grade/condition, customer job history and run data, and dates of inspection. The customer job history may include data regarding rotating hours, corrosive environment hours and deviated rotating hours for the drill pipe.

Writeable RFID tags used as the identification members enable storing information such as pipe dimensions and mechanical properties or material certificates, inspection results, where/when used, physical properties, operating parameters and inventory. Writing the information to the RFID tag may occur during or after inspection and/or when the pipe is manufactured. Depending on the on-rig identification equipment used by the customer, the identification members may thus contain the actual job history for each individual pipe, which may also be logged in other electronic storage media or printouts for later input into the database during the inspection.

Further, some of the detectors 408, 412, 414, 416, 418 and/or additional detectors may attach to forklifts, trucks, hoisting/lifting/moving equipment, and/or the racks 404, 407. When placed on this equipment, reading the identification members on the drill pipe permits the serial number and movement information within the pipe yard 400 to be communicated to the database. For example, the serial numbers may transfer to the database as pipe rolls across the racks 404, 407 when the detector is placed on, or in proximity to, the racks 404, 407. Avoiding manual serial number reading prevents hand crush injuries in the pipe yard 400 due to pipe rolling or shifting while hands are adjacent the pipe or are even handling or touching the pipe to, for example, rub the serial number clean. For this reason, the hand-held detector 412 also distances hands and other body parts of the user 410 a safe distance from the pipe since a reader portion of the hand-held detector 412 is affixed to the end of a wand so that the reader portion may be extended to a position proximate the identification member of a given piece of pipe. The hand-held detector 412 may extend a fixed or adjustable length of at least 1.0 foot, more than 2.0 feet, or even 3.0 feet or more depending on location of the identification members. The hand-held detector 412 also thereby helps with inspection of pipe that is racked in large arrays because the user 410 of the hand-held detector 412 does not have to crawl on the racked pipe to read every identification member.

Strategic placement of one or more of the detectors 408, 412, 414, 416, 418 may enable recordation of loading or unloading of trucks going/coming from vendors/customer and automatically communicate to the database. For example, the gate detector 408 at the entrance of the pipe yard 400 may include arrays of fixed antenna coupled through circuitry to differentiate the direction of the trucks coming from and going into the pipe yard 400, and hence, determine whether drill pipes carried on the trucks are entering or leaving the pipe yard 400 or shipping/receiving station depending on where the gate detector 408 is located. Computer software connected to the database may generate reports showing the inventory status of the drill pipe having identification members and generate shipping and receiving tickets or e-mail notification to customers upon shipment.

The first, second and third triangulation detectors 414, 416, 418 positioned around the pipe stack 402 demonstrate further pipe location tracking capabilities for some embodiments. The triangulation detectors 414, 416, 418 may include additional detectors operating on the same principles as the triangulation approach described herein. Detectors may provide redundancy and cross verification. Also, the detectors may scan across different planes, as the first, second and third triangulation detectors 414, 416, 418 define one plane. In operation, the triangulation detectors 414, 416, 418 read identification members on each piece of pipe within the pipe stack 402 and determine a distance to any given pipe from a given detector. Analysis of time distance of arrival (ping response time), received signal strength indication, and angle of arrival of transmitted signals may determine these distances. Any other signal processing methods may further facilitate distance calculations between the triangulation detectors 414, 416, 418 and the individual identification members such as methods based on phase rate of change of backscatter-modulated signals.

With the distances to the triangulation detectors 414, 416, 418 determined and the location of the triangulation detectors 414, 416, 418 known whether fixed, movable or hand-held, using trilateration may determine an accurate location of each identification member and hence each pipe. For example, calculating the difference in distance between the first and second triangulation detectors 414, 416 for one particular identification member forms a curve that indicates all possible identification member locations as determined by the first and second triangulation detectors 414, 416. Using the third triangulation detector 418 further limits the possible locations such that calculating the intersection point of the curves results in a location for the drill pipe.

FIG. 5 shows an exemplary output obtained with the triangulation detectors 414, 416, 418 to display a graphic representation of the pipe stack 402 on a computer 500. Selecting by, for example, clicking on an icon displayed on the computer 500 may enable on-screen data retrieval of information (e.g., inspection records, maintenance history, run life) correlated in the database to a particular pipe within the pipe stack 402 associated with that icon. As illustrated, searches initiated for set criteria identify or flag where on the storage rack 404 or otherwise in the pipe yard 400, that pipes meeting the criteria are located. For example, "X" and filled-in markings on the graphic representation of the pipe stack 402 may correspond, respectively to drill pipes having a minimum wall thickness less than x inches and drill pipes having a minimum wall thickness less than y inches. Such information may facilitate filling orders for customers requesting only drill pipe having wall thickness greater than x inches. Customers may therefore select assets based upon history and/or physical properties rather than having to use broad classifications such as API standards. Further, the graphic representation may illustrate useful information in making forecasts for purchasing new/replacement drill pipe since the drill pipe with wall thickness less than x inches may be suitable for one more rental while the drill pipe with wall thickness less than y inches may be suitable for two more rentals with the rest of the drill pipe capable of multiple more uses.

Figure 6:
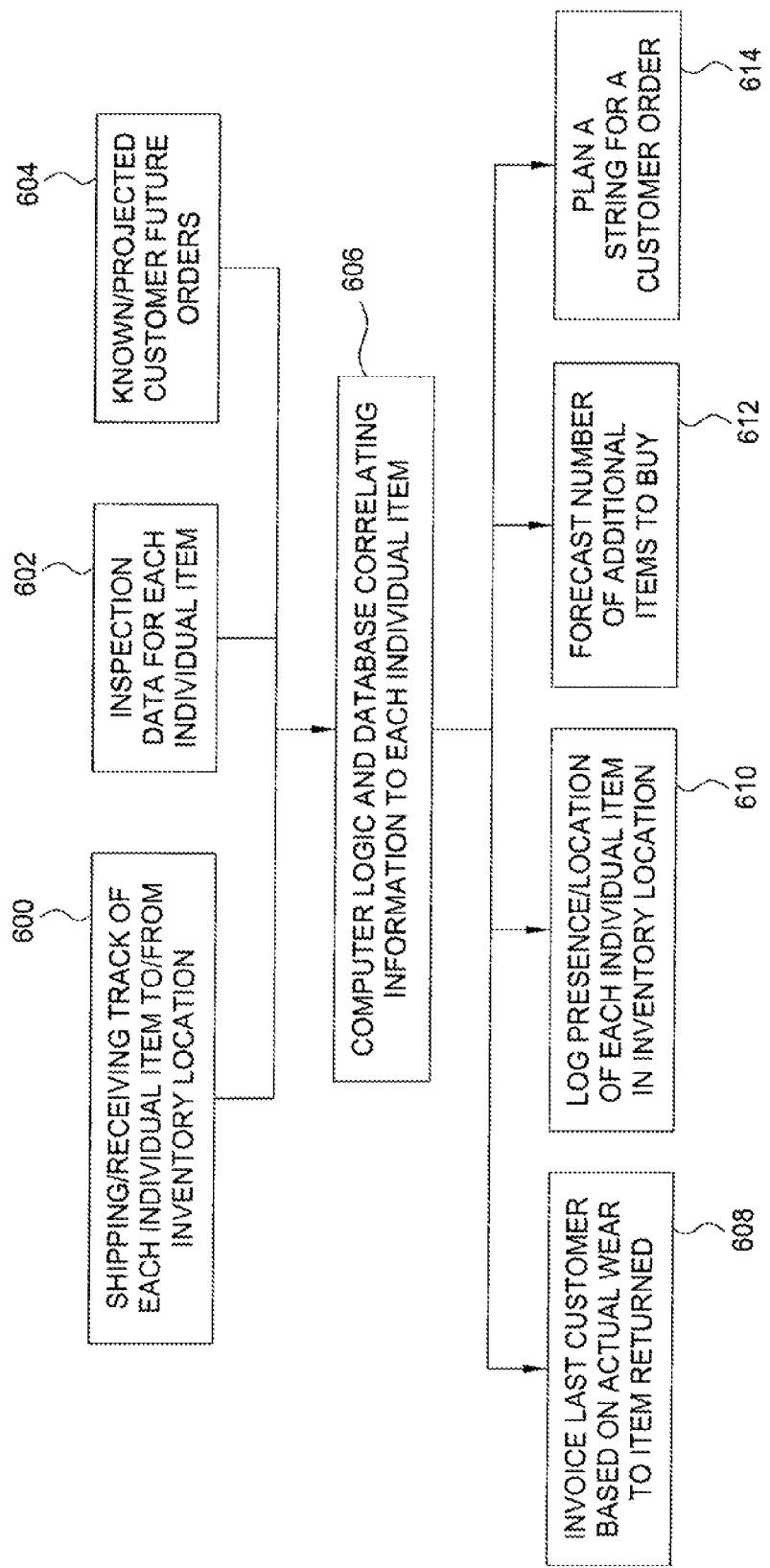
FIG. 6 is a flow chart illustrating information input into a computer database and correlated to an identification code of an item tagged with an identification member such that computer logic outputs various business related functions, according to aspects of the invention.

FIG. 6 illustrates a flow chart of information input into the database and correlated to each individual tagged item such that computer logic may output various business related functions. For explanation purposes, the following description of the steps in the flow chart makes reference to the specific application illustrated in FIGS. 4 and 5. At a tracking input step 600, gate detector 408 reads identification members on individual drill pipe as the drill pipe enters and exits the pipe yard 400. Additionally, triangulation detectors 414, 416, 418 and hand-held detector 412, as examples, may read during the tracking input step 600 the identification members and provide further input information including inventory location. Unique storage identifiers may be further positioned at each location an asset is stored so that the storage identifier along with the identification members on the asset may be correlated within the database for facilitating finding a particular asset and inventory control. An analysis step 606 involves receiving input information regarding presence and/or location data obtained from tracking input step 600 and correlating the information with each individual drill pipe to provide an inventory output step 610. The inventory output step 610 logs presence and/or location of each drill pipe in the pipe yard 400 for functions such as generation of shipping and receiving tickets.

At an inspection input step 602, inspection results communicate to the analysis step 606 for correlation to each individual drill pipe. Comparing the inspection results of returned drill pipe with prior inspection results that are maintained in the database and obtained before shipment to the customer enables determining whether anomalies (such as excessive wear) require further investigation, and may further flag such anomalies within a customer account management system. Therefore, fee evaluation output step 608 automatically initiates or at least instigates billing. For example, the fee evaluation output step 608 may invoice according to wear and/or use of the drill pipe as determined after inspection input step 602.

The inspection input step 602 also aids in managing inventory levels in the pipe yard 400. Decisions regarding retirement of the drill pipe occur at inspection input step 602, thereby reducing inventory levels with each drill pipe retired. However, the inspection data obtained at inspection input step 602 and input into analysis step 606 also contains valuable information with respect to remaining inventory (i.e., non-retired drill pipe) in order to help forecast the number of additional items to buy in purchasing output step 612. In practice, rental companies can only place orders from pipe manufacturers or suppliers at limited time windows making purchase decisions imperative prior to actual need that can be difficult or impossible to predict with limited information. For example, data from the inspection input step 602 once correlated in the analysis step 606 may provide evaluations such as percentage of pipe having less than 50% of useable wall thickness left and hence useable at only one more job. These evaluations performed by the computer at the analysis step 606 may further differentiate among quantity of certain sizes of pipes and possible trendlines for wear patterns based on, for example, the region or particular customers. To more accurately forecast number of drill pipe to buy at purchasing output step 612, the analysis step 606 may receive data regarding known future orders from customers and/or make projections based on past recent customer orders as depicted by upcoming rental order input step 604. Furthermore, results of the purchasing output step 612 may automatically trigger purchases of the forecast number of drill pipe needed.

With input information as described herein correlated to each individual drill pipe, the inventory output step 610 may facilitate searches for particular customer requirements during an order filling output step 614, and otherwise aid in locating and directing pipe having certain characteristics within the pipe yard 400. In this regard, customers may require drill pipe meeting certain standards, which may be identified such as shown in FIG. 5. A quick inventory check utilizing the order filling output step 614 may ensure that the rental company has sufficient supplies meeting the standards set by the customer. For example, the customer may design strings of long length or otherwise pushing the yield strength of the drill pipe, such that the first few thousand feet of drill pipe within the string must be guaranteed as new or of like new quality. The order filling output step 614 may select appropriate pipe within the yard 400 to fulfill these needs.

Lower quality or de-rated pipe may meet other customer demands or be utilized at the bottom of the string.

Other job planning aspects include ordering joints of the drill pipe within a string at order filling output step 614 to improve and lengthen useful life of the drill pipe. By way of example, the order filling output step 614 may select pipe having low or no deviated rotating (i.e., rotation at a directional induced bend) hours for a section of the string where deviated rotating hours are expected to be incurred. On the other hand, the order filling output step 614 may choose pipe with relatively higher deviated rotating hours for disposing in sections of the string where the drill pipe only rotates in substantially straight portions of the borehole. Therefore, the order filling output step 614 may maintain the pipe in inventory with deviated rotating hours below a dangerous threshold without leading to premature retirement of certain drill pipe due to high deviated rotating hours. Further, the use of the drill pipe can be rotated at the rig to reduce cumulative fatigue and wear by tracking the hours in deviated sections of the well.

In some embodiments, the computer with the database as described heretofore enables internet access to the information therein and the output functions such as the order filling, inventory, purchasing, and fee evaluation output steps 614, 610, 612, 608. A website may thus provide access or at least limited access from a remote location. For example, remote access may make the graphic representation shown in FIG. 5 viewable from a home computer, laptop or phone PDA. Pipe selection and drill string configuration may occur on site at a drill rig or at a customer's place of business due to this remote accessibility.

Referring back to FIGS. 1-3, various different identification tagging designs enable coupling of a tag to a piece of inventory other than the groove 106 that is undercut to house the tag cartridge 300. For example, the tag may be disposed in a cavity (e.g., circular or elliptical shaped) on the outside of the drill pipe. Some embodiments utilize epoxies or bonding agents to secure the tag to the outside of the drill pipe or within the cavity or slot machined in the drill pipe for receiving the tag. The epoxy or bonding agent used alone or in combination with mechanical retention configurations described herein for affixing the tag to the drill pipe may further provide protection from impact, erosion, corrosion, and wear. Depth of the cavity or slot may be selected to facilitate in preventing or eliminating interference of the communication between the reader and the tag caused by metal surrounding the tag. To aid in counteracting this potential interference, any of the embodiments described herein may space the antenna of the tag offset from the bottom of the cavity through the packaging of the tag or the inclusion of an insert. For some embodiments, a pressure relief system in the design of the tag or a mounting system, such as a port through the tag or channel along the mounting system, may facilitate keeping down hole pressures from accumulating and becoming trapped behind the tag. For example, at least one relief port 1000 passing through respective tags as identified in FIGS. 3, 7, 8, 9 and 11 illustrate one way to ensure that the tags do not pop out from pressure fluctuations.

FIG. 7 shows a drill pipe 700 having an identification cavity 706 with a complimentary tag cartridge 730 threaded into the cavity 706. Mating threads 710 between the cavity 706 and a carrier 760 of the tag cartridge 730 engage to retain the tag cartridge 730 in the cavity 706. The carrier 760 may be made of a softer material relative to the drill pipe 700. Locking of the carrier 760 into place may occur by making the mating threads 710 with at least one of the last few engaged threads not of standard thread form such that as the carrier 760 is screwed into the cavity 706 the carrier 760 deforms, which locks the carrier 760 into place. For some embodiments, the carrier 760 and the cavity 706 taper together or with different tapers such that the carrier 760 becomes wedged once inserted into the cavity 706.

FIG. 8 illustrates a drill pipe 800 having an identification cavity 806 with a complimentary tag cartridge 830 slip fit into the cavity 806. Unidirectional teeth 810 on an outside of a carrier 860 for the cartridge 830 engage an inside surface of the cavity 806. Angle of the teeth 810 permits press fitting of the cartridge 830 into the cavity 806 with sliding inward movement but prevents outward movement of the cartridge 830 by biting into the pipe 800.

FIG. 9 shows a drill pipe 900 having an identification cavity 906 with a tag cartridge 930 retained in the cavity 906 by a snap ring 960. A groove 910 machined out in the cavity 906 retains the snap ring 960 relative to the pipe 900. Interference with the snap ring 960 mechanically locks the cartridge 930 into place.

FIGS. 10 and 11 illustrate a configuration utilizing a deformable carrier 1060. Prior to insertion into an identification cavity 1106 and subsequent deformation, the carrier 1060 as shown in FIG. 10 defines a substantially cylindrical shape. FIG. 11 shows the carrier 1060 deformed into an undercut portion 1110 of the cavity 1106 upon assembly with a wall of the carrier 1060 forced outward into the undercut portion 1110 to lock the carrier 1060 in place. The deformation may result from further insertion force applied to the carrier 1060 after the carrier 1060 bottoms out in the cavity 1106. For some embodiments, assembly of a tag cartridge 1130 with the carrier 1060 housing any components such RFID antennae occurs prior to insertion of the carrier 1060 into the cavity 1106. Various components of the tag cartridge 1130 in some embodiments may snap into the carrier 1060 after the carrier 1060 is seated in the cavity 1106 and deformed.

While the foregoing is directed to embodiments of the present invention, other and further embodiments of the invention may be devised without departing from the basic scope thereof, and the scope thereof is determined by the claims that follow.

What is claimed is:

1. An apparatus, comprising:
   an oilfield tubular having a cavity formed on an outer surface thereof; and
   a tag cartridge configured to be disposed in the cavity of tubular, the tag cartridge having a remotely readable identification tag, wherein the tag cartridge includes a relief port formed through a body of the tag cartridge, a first end of the relief port opens to a surface of the cavity, and a second end of the relief port opens to an exterior of the apparatus.

2. The apparatus of claim 1, wherein the cavity includes sides that converge toward an opening that opens perpendicular to a longitudinal center axis of the tubular member.

3. The apparatus of claim 2, wherein the tag cartridge is shrink fit into the cavity.

4. The apparatus of claim 1, wherein the tag cartridge is threaded with a misfit engagement within the cavity of the tubular member.

5. The apparatus of claim 1, wherein a snap ring retains the tag cartridge within the cavity of the tubular member.

6. The apparatus of claim 1, wherein the tag cartridge includes unidirectional angled teeth that secure the tag cartridge within the cavity of the tubular member.

7. The apparatus of claim 1, wherein the remotely readable identification tag comprises a radio frequency identification (RFID) tag.

8. The apparatus of claim 1, wherein the remotely readable identification tag comprises a surface acoustic wave (SAW) tag.

* * * * *